May 17, 1938.  T. V. BARNARD  2,117,872
CORN POPPER
Filed Oct. 24, 1935  2 Sheets-Sheet 1
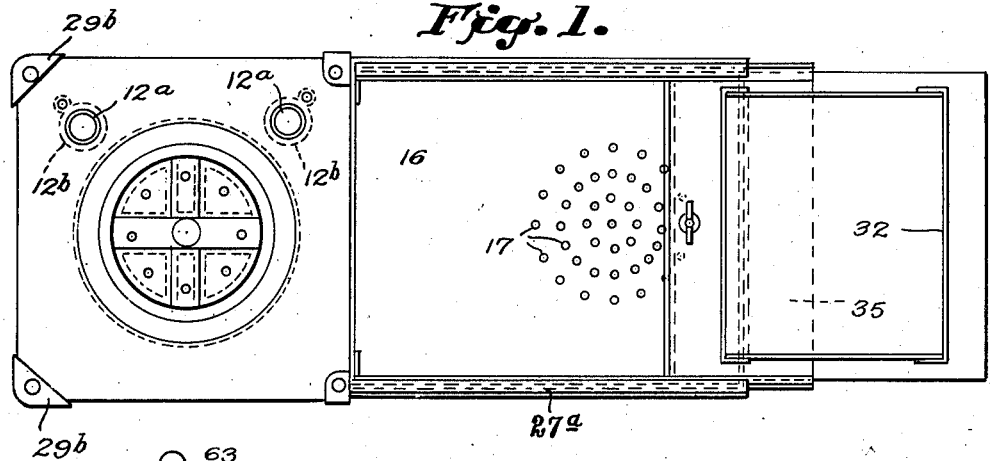
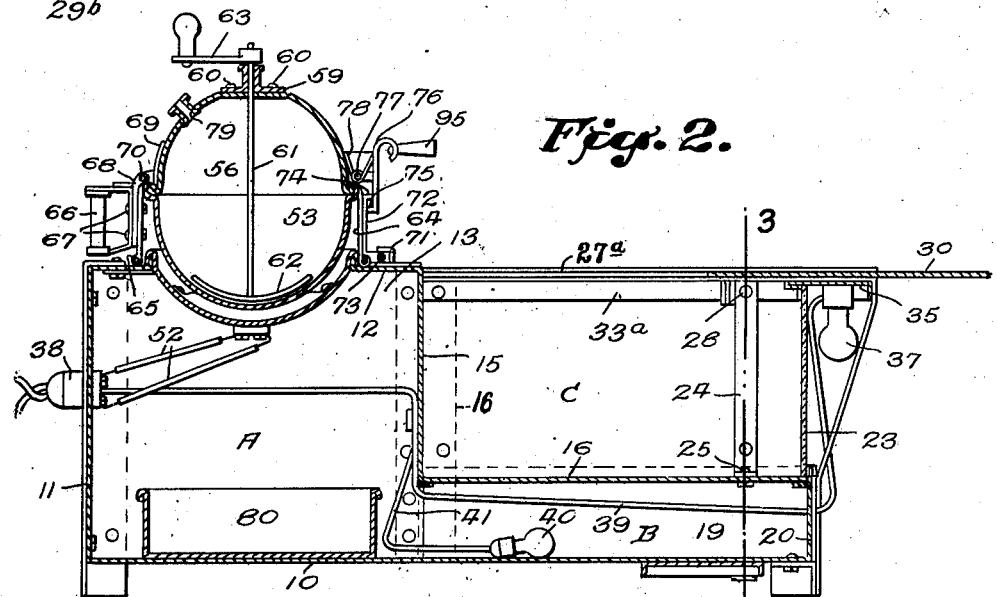
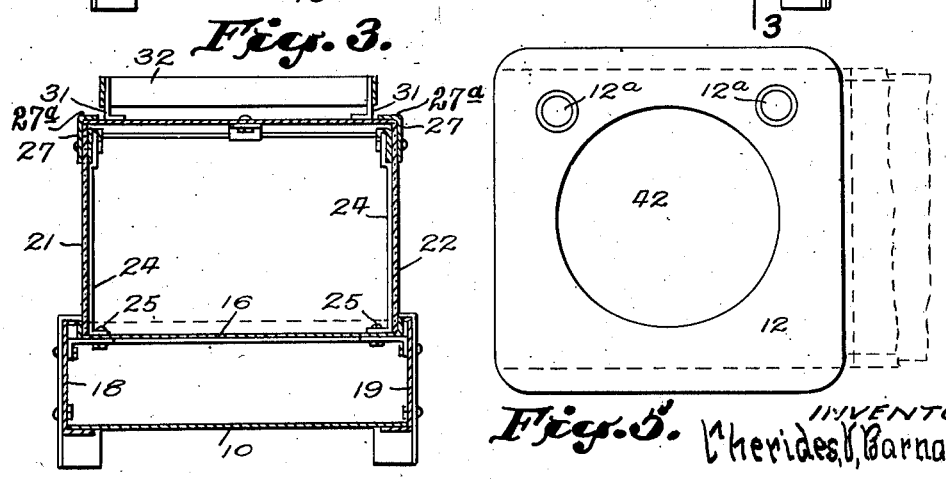
INVENTOR
Therides V. Barnard May 17, 1938.                T. V. BARNARD                2,117,872
                              CORN POPPER
                          Filed Oct. 24, 1935            2 Sheets-Sheet 2
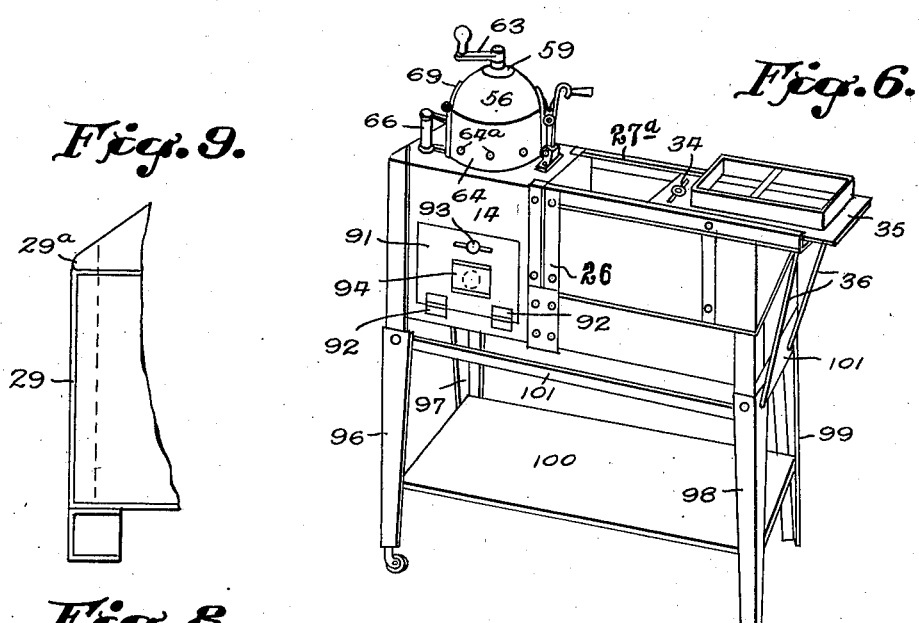
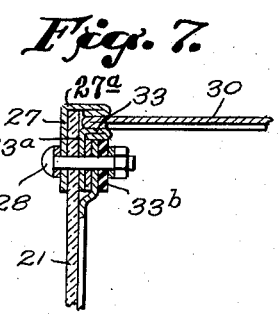
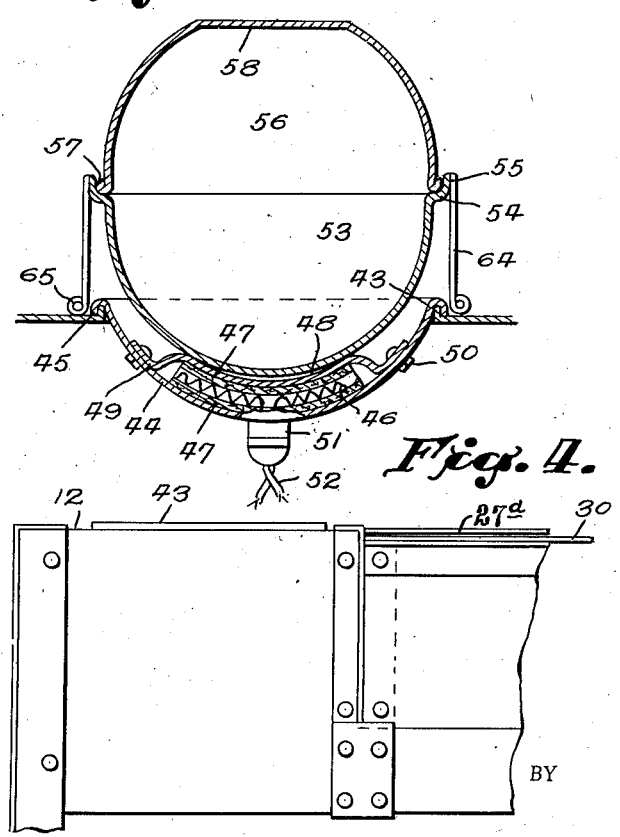
INVENTOR.
Cherides V. Barnard
BY
ATTORNEY.

Patented May 17, 1938

2,117,872

UNITED STATES PATENT OFFICE 2,117,872

CORN POPPER

Therides V. Barnard, Omaha, Nebr.

Application October 24, 1935, Serial No. 46,563

4 Claims. (Cl. 53—4)

My invention relates particularly to corn popping machines and to machines of this character generally.

An important object of my invention is to provide a machine of this character including a stand having an offset in which is a glass enclosed receptacle with a transparent slidably mounted cover.

Another object is to provide in a machine of this character a removable kettle supported on the top wall of the stand, said kettle having hinge means whereby it may be tilted to empty same.

Another object is to provide a machine of this character having a removable concave heater unit adapted for intimate register with the convex bottom of the kettle.

Another object is to provide a machine of this character having a plurality of compartments with means for heating same and including a nut warming tray for one of the compartments.

Another object is to provide in a machine of this character the combination of a stand and a stand support.

Another object of the invention is to provide a machine of this character having a substantially spherical kettle provided with a hinged cover having a steam tube.

Another object is to provide a machine of this character having a removable agitator for the kettle.

Another object of the invention is to provide a machine of this character having perforations in the bottom of the receptacle whereby corn may be screened.

Another object is to provide a machine of this character having a neat, finished appearance.

A further object is to provide a machine of this character having openings in the top of the stand adapted to be closed by movable shutters.

Numerous other objects and advantages of this invention will be apparent as it is better understood from the following detailed description, which, taken in connection with the accompanying drawings discloses a preferred embodiment thereof.

Referring to the drawings:

Figure 1 is a plan view of the machine.

Figure 2 is a vertical longitudinal section through the stand of the machine.

Figure 3 is a vertical section through the machine taken on line 3—3 of Figure 2.

Figure 4 is a fragmentary view showing the construction of the stand units.

Figure 5 is a plan view of the stand unconnected with the offset.

Figure 6 is a perspective view of the entire machine.

Figure 7 is an enlarged detail of receptacle construction with the glass cover operatively associated therewith.

Figure 8 is an enlarged vertical section through the kettle and heater unit in operative association.

Figure 9 is an enlarged fragmentary view showing the corner construction of the stand.

Referring more particularly to the drawings, which illustrate a preferred embodiment of my invention, the machine has a stand formed into a box-like unit. The stand comprises a floor 10, end wall 11, top 12, rear wall 13, front wall 14, and vertical partition 15, forming compartment A. The partition 15 is turned outwardly to provide a horizontal partition 16 spaced upwardly of the floor 10, which extends thereunder, forming the lower part of an offset identified as chamber B. Said partition 16 serves as the bottom of a receptacle C in which popped corn may be stored. At one end of the partition 16 same is provided with a plurality of holes 17 for screening corn, the unpopped kernels dropping through the holes 17 into chamber B, from which they may be removed through compartment A. The chamber B is provided with a front side 18, a back side 19, and an end wall 20 of sheet metal, the upper edges of said front and back sides and end wall extending somewhat upwardly of the partition 16. A front side 21, back side 22 and end 23 of transparent material, such as glass, are provided to form the outer walls of the receptacle C of the offset while partition 15 forms the inner wall thereof. The lower portions of said front side 21, back side 22 and end 23 are received against the upwardly extending portions of the respective front side 18, back side 19 and end 20. Anchor bars 24 are secured to partition 16 by bolts 25 and extend upwardly in association with the inner surfaces of the front and back sides, 21 and 22 respectively, of the receptacle. Vertical brackets 26 are provided along the vertical edges of partition 15 in contact with the outer faces of sides 21 and 22 of the receptacle. Horizontal angle plates 27 are provided adjacent the upper edges of said sides 21 and 22 and are secured to the upper ends of anchor bars 24 by bolts 28 which also pass through suitable openings in sides 21 and 22. The adjacent edges of end 23 and sides 21 and 22 may be glued together. The corners 29 and 29a of the stand are rounded, as shown in Fig. 9 and are covered by a cap 29b to provide a finished appearance for the stand.

A slidable cover 30 of glass is provided for the receptacle C to which are secured brackets 31 supporting a carton rack 32. The front and rear edge portions of the cover 30 slide on horizontal surfaces 33 of cover supporting brackets 33a secured adjacent the outer ends thereof between the respective sides 21 and 22 and the respective anchor bars 24 by bolts 28. Rubber washers 33b are provided on the respective bolts 28 to prevent breakage of the glass side walls due to twisting or straining of same. The horizontal angle plates 27 are turned inwardly at 27a over the side edge portions of the cover to prevent said cover from being lifted off the receptacle and completing grooves in which said cover slides. A latch 34 is provided for the cover 30 adjacent the inner end thereof.

The angle plates 27 extend beyond the end of the receptacle and have a table 35 secured therebetween below the plane of the lower surface of the slidable cover 30 and said table is adapted to support the cover 30 when in open positions. Braces 36 strengthen the outer end of the table.

A colored electric bulb 37 is mounted beneath the table 35 to attract attention and aid in displaying the popped corn in the receptacle. The bulb 37 is connected with an electric contact plug 38 by an electric cord 39.

As it is desirable to keep the popped corn in the receptacle C warm a warming bulb 40 is provided in chamber B, current for said bulb being supplied by electric cord 41 connected with cord 39.

The top 12 of compartment A is provided with a large central opening 42 provided with a marginal, upturned flange 43. A concave heater base 44 is depended in the opening 42 and is provided with a marginal, downturned edge 45 spaced outwardly of the base 44 and adapted to receive flange 43 therebetween, thereby providing effective means for suspending the base and prevent accidental displacement thereof, said base being adapted to be readily lifted from the opening when desired.

A resistance unit 46 is provided in the base secured between concavo-convex keepers 47, said keepers and unit 46 being covered by a concave face plate 48 having an outwardly and downwardly extending peripheral shoulder terminating in a flange 49 which conforms to the inner surface of the base. Bolts 50 through the flange and base 44 secure the face plate to the base. A contact plug 51 for the resistance unit 46 is provided beneath the base and is electrically connected with contact plug 38 by an electric cord 52.

The general shape of the kettle is an elongated sphere and comprises a lower portion or bowl 53 having an outwardly extending shoulder 54 about its rim which terminates in an upwardly extending flange 55. A cover 56, having its lower edge turned back to form a bead 57, encloses the upper portion of the kettle, the bead 57 being adapted to rest on the shoulder 54 adjacent the junction of said shoulder and flange 55.

The cover 56 is provided with an opening 58 at the top which is normally closed by a flanged bearing 59 secured to the top by screws 60, said bearing having a vertical opening in which is operatively received shaft 61 of an agitator 62, said agitator being in the bottom of the bowl and conforming to the shape of said bottom. A crank 63 is detachably secured to the upper end of shaft 61 which projects upwardly of the bearing. The crank may be removed from the shaft and the agitator removed from the kettle when it is desired to use same for cooking.

About the bowl 53 is an apron 64 having holes 64a therein, the upper end of said apron snugly receiving the flange 55 and being secured thereto by welding. The lower edge of the apron 64 is provided with a rolled bead 65 which rests on the top 12 about the downturned edge 45 of the base 44. The length of the apron is less than the depth of the bowl 53 so that the convex bottom of the bowl is positioned on the upper concave surface of the face plate 48.

A handle 66 is secured to the apron 64 by bolts 67, said bolts also securing the lower member 68 of the cover hinge, member 69 of said hinge being secured to the cover of the kettle to permit said cover to be swung from the bowl on hinge pin 70.

The entire kettle assembly is adapted to be swung over the receptacle C on a kettle hinge comprising a hinge portion 71 secured to top 12 and hinge piece 72 secured to the apron, the pivot of said hinge being pin 73. The piece 72 is provided with an outwardly extending lug 74 for latching engagement with a flange 75 of latch member 76 hinged at 77 to the cover of the kettle. An expansion spring 78, secured on pin 77 retains the latch member in latching engagement with the lug 74 when the kettle is closed.

A steam tube or vent 79 is provided in the cover to permit the escape of surplus steam while corn is being popped. A nut warming pan 80 may be placed in the bottom of compartment A wherein nuts may be kept warm by heat from the heater unit.

Access to compartment A is provided by a door 91 in the front wall 14, said door being mounted on hinges 92 and secured in its closed position by a latch 93. A window 94, of suitable transparent material, such as glass, is provided in the door 91. Vents 12a in the top 12 are provided to permit ventilation of compartment A and may be closed by shutters indicated by dotted lines 12b when ventilation of said compartment is not desired.

When it is desired to put corn in the kettle for popping the cover latch is released by means of a handle 95 on latch member 75 and the cover is then swung back on the cover hinge on the opposite side thereof from the handle 95. After placing the corn in the kettle the cover is closed and latched and heat is applied by means of the heater unit. During the popping of the corn same is agitated by agitator 62. Scorching of the corn is thereby prevented. After the corn is popped the glass cover 30 is opened, the latch of the kettle cover released and the cover swung to an open position. The entire kettle is then swung over the receptacle on the kettle hinge by means of handle 66, the cover being held open by grasping handle 95. The popped corn is then poured into the receptacle and the unpopped kernels sifted through the openings 17 in partition 16 leaving only popped corn in the receptacle.

A stand support is provided comprising legs 96, 97, 98 and 99; legs 96 and 97 being provided with casters to permit the machine to be moved about easily. A shelf 100 is secured between the legs, the corners of said shelf being welded to the respective legs thus strengthening the stand support. Braces 101 are secured to the legs adjacent the tops thereof to give added strength to said stand support, said stand and stand support being removably secured together.

It is thought that the invention and many of its attendant advantages will be understood from the foregoing description, and it will be apparent that various changes may be made in the form, construction and arrangement of the parts without department from the spirit and scope of the invention or sacrificing all of its material advantages, the form hereinbefore described being merely a preferred embodiment thereof.

Having thus described my invention what I claim is:

1. A popcorn machine comprising a stand with an offset, a receptacle positioned in the offset, said receptacle having substantially parallel grooves adjacent the top thereof, a sliding cover operably received in said grooves, a table at one end of the receptacle adapted to support the slidable cover when same is in an open position, a top for said stand having an opening therein, an upwardly extending flange about the opening, a heater unit in the opening and attached to the flange, a warming chamber in said stand, and a stand support removably associated with the stand.

2. A popcorn machine comprising a stand, a top having an opening therein, a flange about the opening, an offset in said stand, a receptacle for said offset, a sliding cover for the receptacle, an elongated substantially spherical kettle positioned on the top over the opening, said kettle comprising a bowl and a cover hinged to the bowl, a flange on the bowl, an apron welded to the flange, said apron having opening therein, a steam tube in said cover, a bearing on the cover, a removably mounted agitator operatively associated in the bearing, a concave heater unit beneath the kettle, said heater unit having a concave base supported by the flange of the top, a concave face plate secured to the base in spaced relation therefrom, concave keepers between the face plate and the base, a heating element in the keepers, a cap for each stand corner, and a supporting frame for said stand which includes a leg for each corner of said stand.

3. A popcorn machine comprising a stand with an offset, said stand having a top with an opening therein, a peripheral upwardly extending flange about said opening, a concave heating unit base received in said opening and depending therein, said base having a downturned free edge forming a peripheral channel in which is received the upwardly extending flange about the opening in the top whereby said base is removably supported in the opening, an electric heater unit in the bottom of the base, a concave face plate securing the heater unit in the base, and a popping kettle supported on the top in operative association with the heater unit.

4. A popcorn machine comprising a stand with an offset, said stand having a top with an opening therein, a peripheral upwardly extending flange about said opening, a concave heating unit base received dependingly in the opening, said base having a downturned free edge adapted to engage the upturned flange in locking association therewith whereby the base is removably secured in the opening, a heater unit in the bottom of the base, a face plate securing the heater unit to the base, an upwardly extending apron about the opening and resting on the top about the downturned free edge of the base, and a kettle within the apron and welded thereto, said kettle depending in the opening with the bottom thereof in operative association with the heater unit.

THERIDES V. BARNARD.